(12) United States Patent  (10) Patent No.: US 7,722,063 B2
Dieziger  (45) Date of Patent: May 25, 2010

(54) VEHICLE SUSPENSION SYSTEM

(76) Inventor: David Douglas Dieziger, 9755 Horseback Ridge Rd., Missoula, MT (US) 59804

( * ) Notice: Subject to any disclaimer, the term of this patent is extended or adjusted under 35 U.S.C. 154(b) by 0 days.

(21) Appl. No.: 12/417,320

(22) Filed: Apr. 2, 2009

(65) Prior Publication Data

US 2009/0194961 A1    Aug. 6, 2009

Related U.S. Application Data

(63) Continuation-in-part of application No. 11/590,475, filed on Nov. 1, 2006.

(60) Provisional application No. 60/731,415, filed on Oct. 31, 2005.

(51) Int. Cl.
*B60G 21/00* (2006.01)

(52) U.S. Cl. .......................... 280/124.103; 280/124.11; 280/124.111; 280/124.135; 280/5.508

(58) Field of Classification Search .............. 280/5.508, 280/5.509, 6.154, 124.103, 124.11, 124.111, 280/124.134, 124.135, 124.136
See application file for complete search history.

(56) References Cited

U.S. PATENT DOCUMENTS

| | | | | |
|---|---|---|---|---|
| 2,059,419 A * | 11/1936 | Tuft | ............................ | 280/103 |
| 2,092,612 A | 9/1937 | Olley | | |
| 2,260,102 A | 10/1941 | Freret | | |
| 2,960,941 A | 11/1960 | Li | | |
| 3,792,748 A * | 2/1974 | Regier | ......................... | 180/41 |
| 3,976,302 A * | 8/1976 | Hammarstrand | ......... | 280/6.154 |
| 4,020,914 A * | 5/1977 | Trautwein | .................... | 180/210 |
| 4,632,413 A | 12/1986 | Fujita | | |
| 4,887,829 A * | 12/1989 | Prince | ......................... | 280/282 |
| 6,328,125 B1 * | 12/2001 | Van Den Brink et al. | ..... | 180/211 |
| 6,382,646 B1 * | 5/2002 | Shaw | ..................... | 280/87.041 |
| 6,863,288 B2 * | 3/2005 | Van Den Brink et al. | .................... | 280/124.103 |
| 7,487,985 B1 * | 2/2009 | Mighell | ............... | 280/124.103 |
| 7,494,141 B2 | 2/2009 | Bouton | | |
| 7,631,721 B2 * | 12/2009 | Hobbs | ........................ | 180/348 |
| 7,665,749 B2 * | 2/2010 | Wilcox | ................... | 280/124.103 |
| 2003/0102176 A1 * | 6/2003 | Bautista | ...................... | 180/210 |
| 2005/0206101 A1 * | 9/2005 | Bouton | .................... | 280/6.154 |
| 2005/0275181 A1 | 12/2005 | MacIsaac | | |
| 2006/0255550 A1 | 11/2006 | Pfeil | | |
| 2007/0151780 A1 | 7/2007 | Tonoli | | |
| 2007/0176384 A1 | 8/2007 | Brudeli | | |
| 2007/0182120 A1 | 8/2007 | Tonoli | | |
| 2008/0012262 A1 | 1/2008 | Carabelli | | |
| 2008/0197597 A1 | 8/2008 | Moulene | | |
| 2008/0238005 A1 | 10/2008 | James | | |

* cited by examiner

*Primary Examiner*—Toan C To
(74) *Attorney, Agent, or Firm*—Lawrence E. Lambelet, Jr.

(57) ABSTRACT

A suspension system for a tilting vehicular chassis based on more than three wheels separates a tilting component of the chassis from a non-tilting component. The non-tilting component provides a means for powering the vehicle with automotive-type engine and drive train options, while the tilting component provides the turning stability necessary for a narrower wheel base. The narrower wheel base benefits fuel economy. The multiplicity of wheels, and the breadth of platform thus enabled, permits shelter and comfort features for the occupant not otherwise available on a typical two-wheel chassis.

20 Claims, 9 Drawing Sheets

VEHICLE SUSPENSION SYSTEM

CROSS-REFERENCE TO RELATED APPLICATIONS

This is a Continuation-in-Part of U.S. patent application Ser. No. 11/590,475, filed Nov. 1, 2006, claiming priority to Provisional Application 60/731,415, filed Oct. 31, 2005.

FIELD OF THE INVENTION

This invention relates to tilting chassis systems for vehicles, and more particularly to a suspension system for a tilting chassis having more than three wheels.

BACKGROUND OF THE INVENTION

Motorcycles exhibit handling characteristics which are superior in many ways over automobiles, and have less aerodynamic drag and reduced rolling resistance as compared with standard automobiles and automobile tires. Reduced aerodynamic and rolling resistance result in improved fuel economy and vehicle performance. The preferred embodiment of the invention has four tires and is therefore capable of carrying a higher gross weight than a typical motorcycle with two tires. The vehicle can accommodate a larger and heavier engine, heavier fuels and loads such as batteries, more cargo, and the weight of an enclosed aerodynamic body to protect the occupants from the elements and from crashes, while reducing aerodynamic drag.

A vehicle designed around this concept can be constructed as narrow as a motorcycle, which is important because frontal area and shape are significant determinates of aerodynamic drag. The combination of minimal frontal area, an enclosed aerodynamic passenger/cargo compartment, and low rolling friction (drag) motorcycle tires yields improved fuel economy.

Such a vehicle would not require computers, sensors, or mechanical systems to lean the vehicle or to keep it upright at speed. The only lean control mechanism required is a simple combination of bracing which will lock the vehicle in an upright position when parked or at slow speeds, such as when backing or otherwise maneuvering with feet on the ground.

The vehicle's suspension system can be softer and provide a smoother ride than motorcycles and many non-tilting vehicles such as autos, trucks, and ATVs. Typical motorcycle suspension systems are thirty to fifty percent stiffer than those of non-tilting vehicles because motorcycles experience all of the lateral acceleration or "G" force loading occurring during turning maneuvers. The proposed suspension system experiences none of the lateral acceleration of a motorcycle because the suspension system does not lean while turning. It remains in and acts only in the vertical like the suspension system of a typical non-leaning vehicle. Suspension systems of non-tilting vehicles must resist the forces causing the vehicle to lean to the outside of a turn and the resulting outward weight transfer. The proposed suspension system experiences no lateral weight transfer while turning because the vehicle's center of mass is moved to the inside of the turn similar to that of a motorcycle during a balanced turn.

Compared with a typical two-wheeled motorcycle, the preferred embodiment will have twice the traction, thereby promoting shorter braking distances, improved cornering, and the ability to accommodate more powerful engines. Due to the relatively smaller contact patch of motorcycles, the vehicle is less susceptible to hydroplaning than automobiles and trucks. Having the same overall width of a motorcycle makes a vehicle easier to maneuver, requires less parking space, and has access to car pool lanes.

With two front wheels, this design has inherently better front wheel traction, is more stable, and safer than vehicles with one tilting or fixed front wheel. As weight shifts forward as a vehicle slows and stops, front wheel traction is critical for stopping quickly, thus providing a major safety factor.

The prior art is replete with three-wheel tilting chassis. Two exemplary references are U.S. Patent Application 2007/0176384 to Brudeli and U.S. Patent Application 2006/0255550 to Pfeil. In both of these cases, which are typical of the genre, the drive system tilts with the rear, or driven, wheel. Such a tilt of the drive system, however, would not be compatible with an engine and drive train connected to driven wheels through a differential, as might be desirable for the reasons discussed above. If the differential were to be tiltable, the rotation of the drive shaft would bias the tilt attitude while creating complex angles with the driven axles.

Other references, such as U.S. Patent Application 2008/0238005 to James, disclose feedback mechanical systems to control lean. This may be an over-complication, however, considering the case of a motorcycle where no control other than that provided by the rider is needed. A motorcyclist, when provided with handlebar steering, will have a sense of balance while leaning and will know to counter-steer in order to initiate a turn.

U.S. Patent Application 2008/0197597 to Moulene discloses a four-wheel tilting chassis. All components of Moulene's chassis, however, also tilt. Moulene does not disclose sufficient detail of the drive mechanism to understand how it would operate in the context of a tilt.

What is missing in the prior art is a non-tilting component to a tilting chassis structure whereby a power transmission system comparable to an automobile is enabled for the benefits of the same combined with those of a motorcycle.

SUMMARY OF THE INVENTION

In view of the above-mentioned unfulfilled needs, the present invention embodies, but is not limited by, the following objects and advantages:

A first objective is to provide a tilting chassis having more than three wheels which can be used with a drive train using a differential gearbox.

A second objective is to provide improved fuel economy over non-tilting chassis systems.

A third objective is to provide a softer suspension and a smoother ride as compared to a two-wheel chassis system.

A fourth objective is to provide better traction and breaking control as compared to a two-wheel chassis system.

A fifth objective is to enable better passenger protection and comfort than is typically provided by a motorcycle.

A sixth objective is to provide for greater load-carrying capability as compared to a two-wheel chassis system.

A seventh objective is to simplify by eliminating sensors and feedback systems having the purpose of controlling the lean angle of a tilting chassis.

In a preferred embodiment of the present invention, a suspension system for a tilting vehicular chassis comprises a non-tilting frame of longitudinal extent having a first axis and a plurality of first horizontal members, the first horizontal members being rotatably attached in oppositely-disposed pairs about the first axis, at least, at each end. The non-tilting frame supports, at least, a means for motorizing.

The suspension system further comprises a tilting frame of longitudinal extent rotatably attached to the non-tilting frame about the first axis. The tilting frame has a second axis parallel to the first axis and a plurality of second horizontal members. The second horizontal members are rotatably attached in oppositely-disposed pairs about the second axis, each second horizontal member being rotatably attached to a corresponding first horizontal member by a vertical strut. The tilting frame supports, at least, one occupant.

The suspension system of the preferred embodiment additionally comprises a plurality of road-contact wheels rotatably attached to the vertical struts, at least one wheel of which is connected to the means for motorizing. Lastly, the suspension system comprises a means for suspending the paired first horizontal members to ride level with the road while providing for a smooth ride by absorbing road surface irregularities in the articulating recoil of individual wheels.

In a particular preferred embodiment, the means for suspending comprises a vertical beam rigidly attached to the non-tilting frame at the middle of each pair of first horizontal members. One of a pair of shock absorbers extend from the top of the vertical beam to each individual first horizontal member thereby forming a triangular brace.

Also, in a particular preferred embodiment, the means for motorizing is an engine with a power train connected to at least one of the wheels. The power train includes a differential joint and at least one differential drive shaft spur connecting the differential joint to at least one driven wheel. The differential drive shaft spur has an axis and a means for telescopically lengthening and shortening along said axis to accommodate varying distances from the at least one driven wheel to the differential joint caused by tilting or by articulating horizontal members responding to shock absorption.

In a second embodiment of the invention, the paired first horizontal members rotate about two axes flanking the first axis, the flanking axes parallel to and co-planar with the first axis. The second horizontal members similarly rotate about two axes flanking the second axis. The planes of the two sets of flanking axes are constrained to be parallel. In all other aspects, the second embodiment is structurally and functional the same as the preferred embodiment.

As this is not intended to be an exhaustive recitation, other embodiments may be learned from practicing the invention or may otherwise become apparent to those skilled in the art.

DESCRIPTION OF THE DRAWINGS

Various other objects, features and attendant advantages of the present invention will become fully appreciated as the same becomes better understood through the accompanying drawings, in which like reference characters designate the same or similar parts throughout the several views, and wherein.

DETAILED DESCRIPTION OF THE PREFERRED EMBODIMENT

Figure 1:
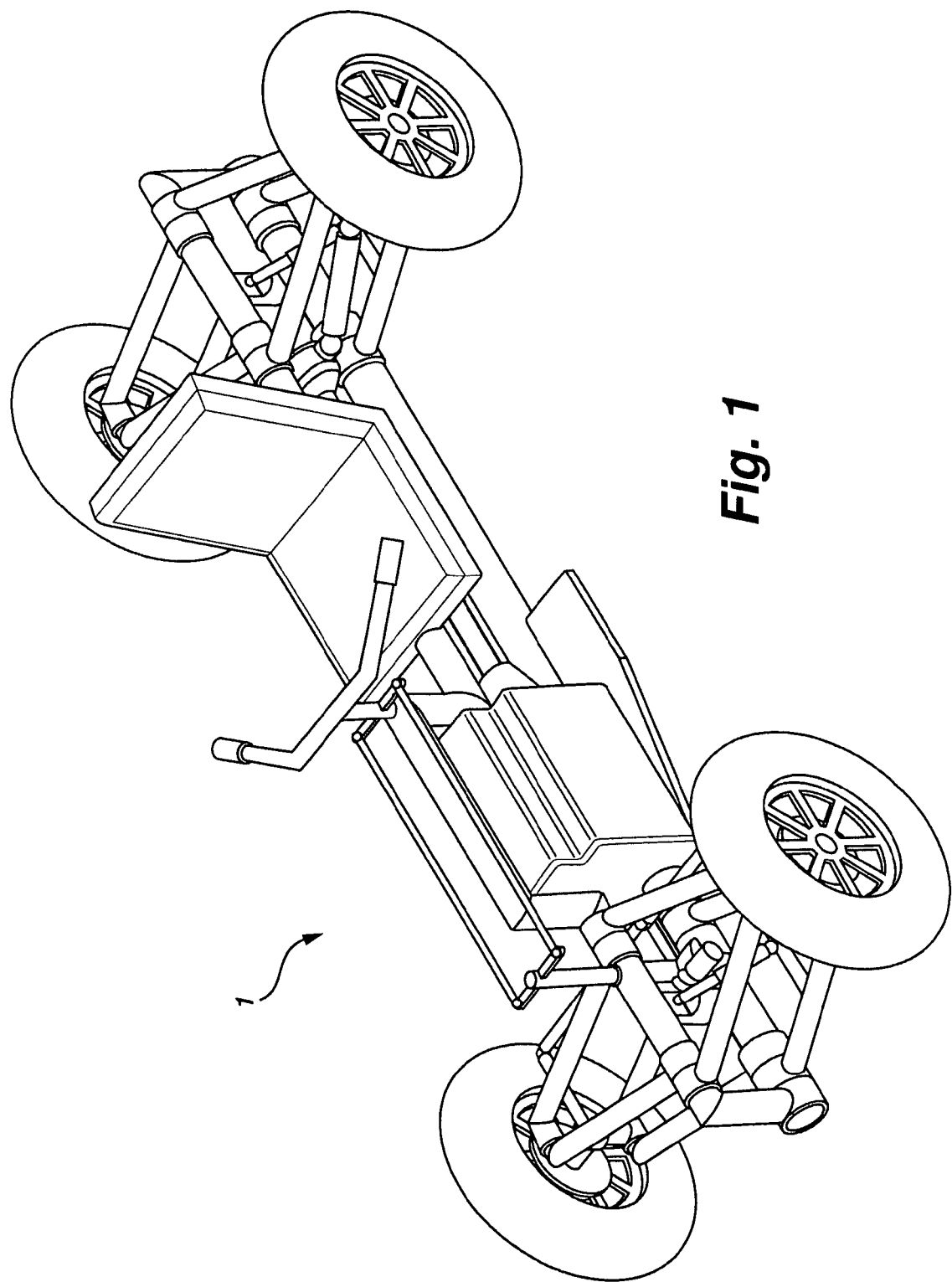
FIG. 1 is a perspective view of the tilting chassis of the invention.
Figure 2:
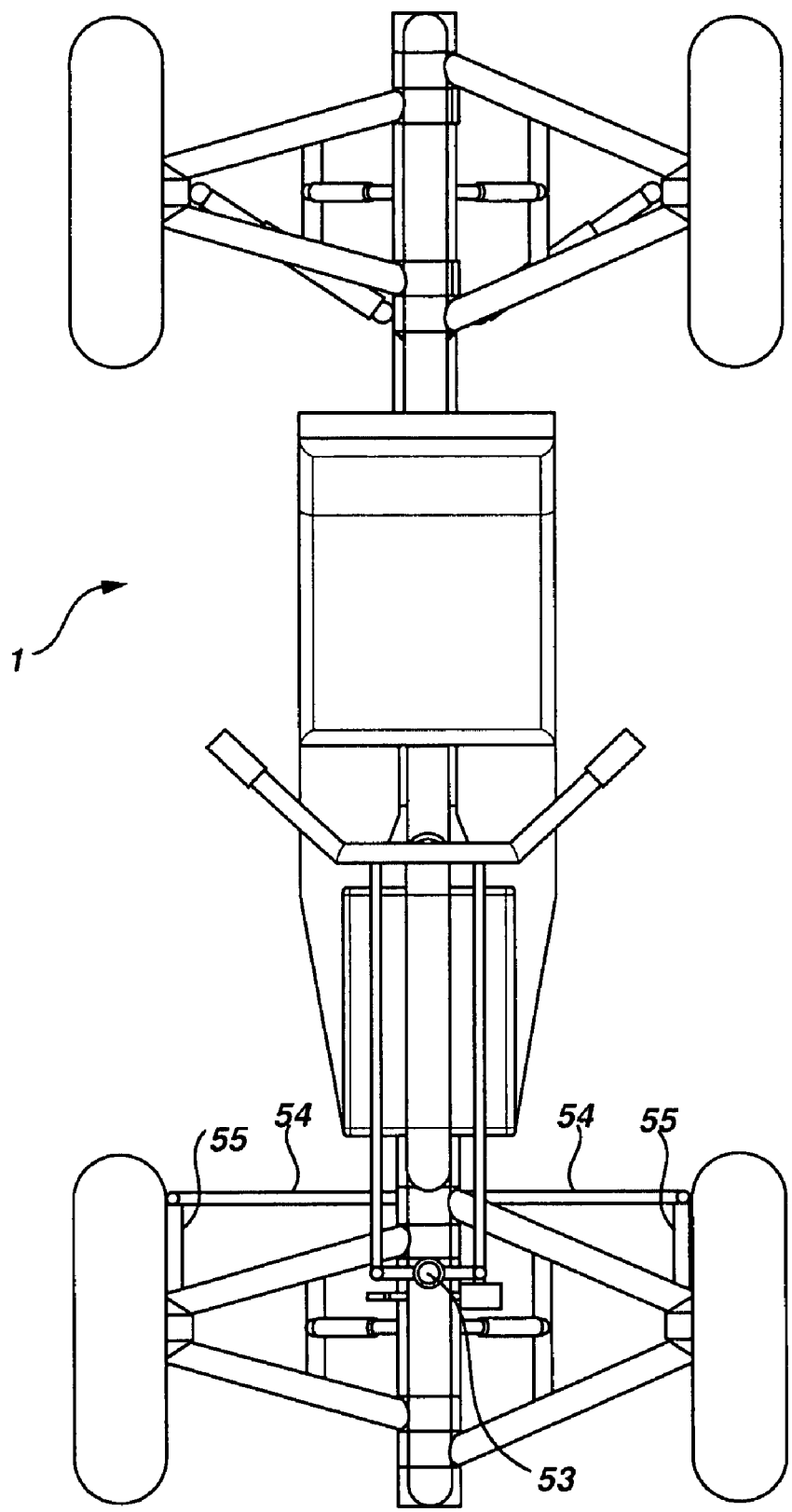
FIG. 2 is a plan view of the tilting chassis of the invention.
Figure 5:
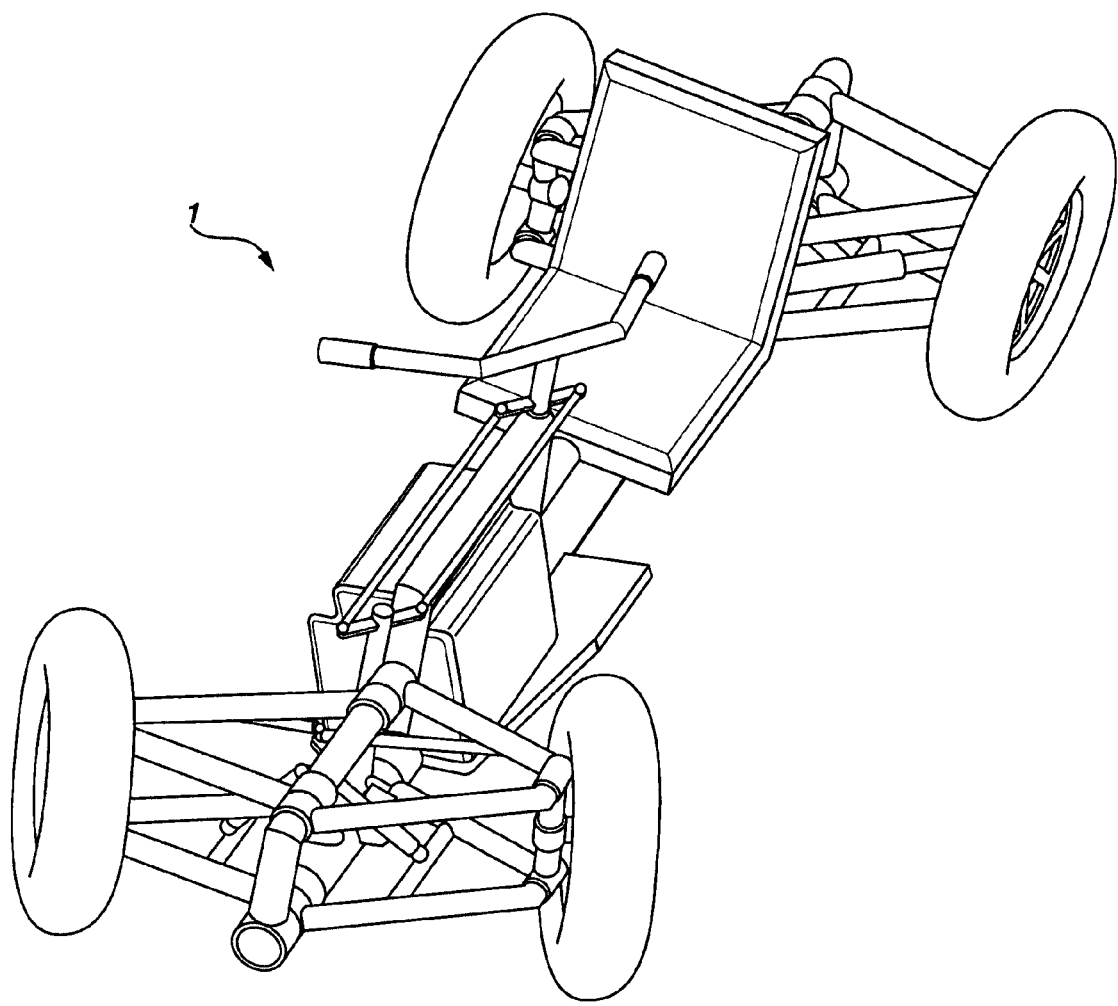
FIG. 5 is a perspective view of the tilting chassis in a tilted turn.
Figure 7:
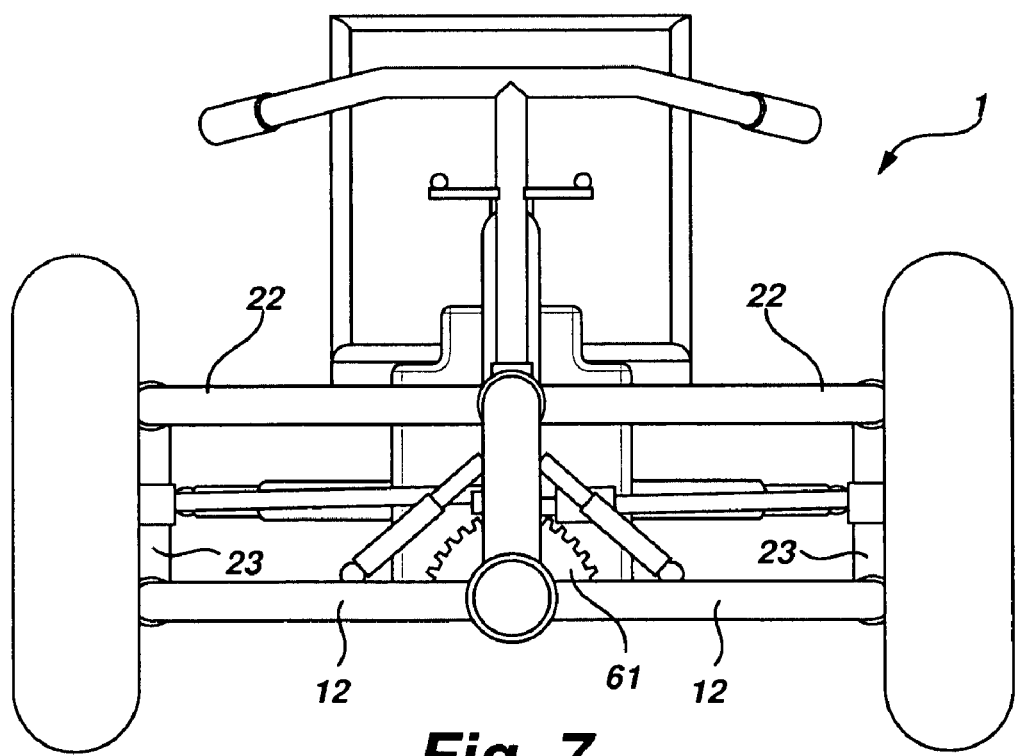
FIG. 7 is a front elevation view of the tilting chassis in a neutral configuration.
Figure 8:
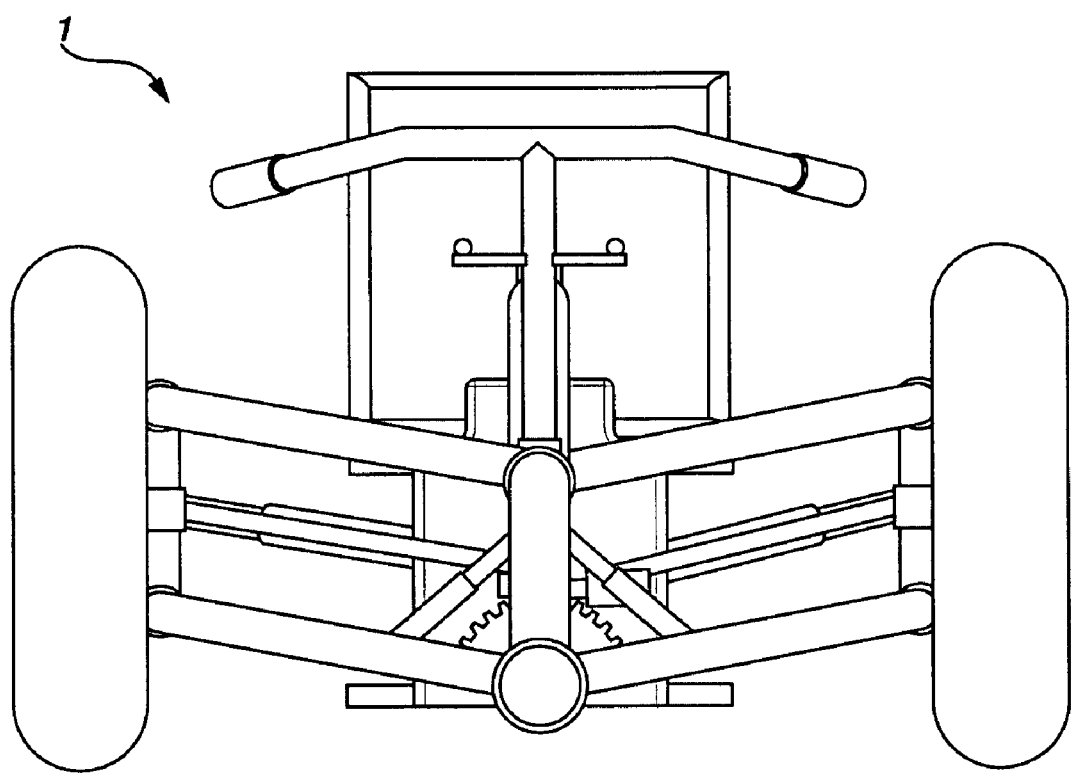
FIG. 8 is a front elevation view of the tilting chassis under a shock-loading configuration.
Figure 9:
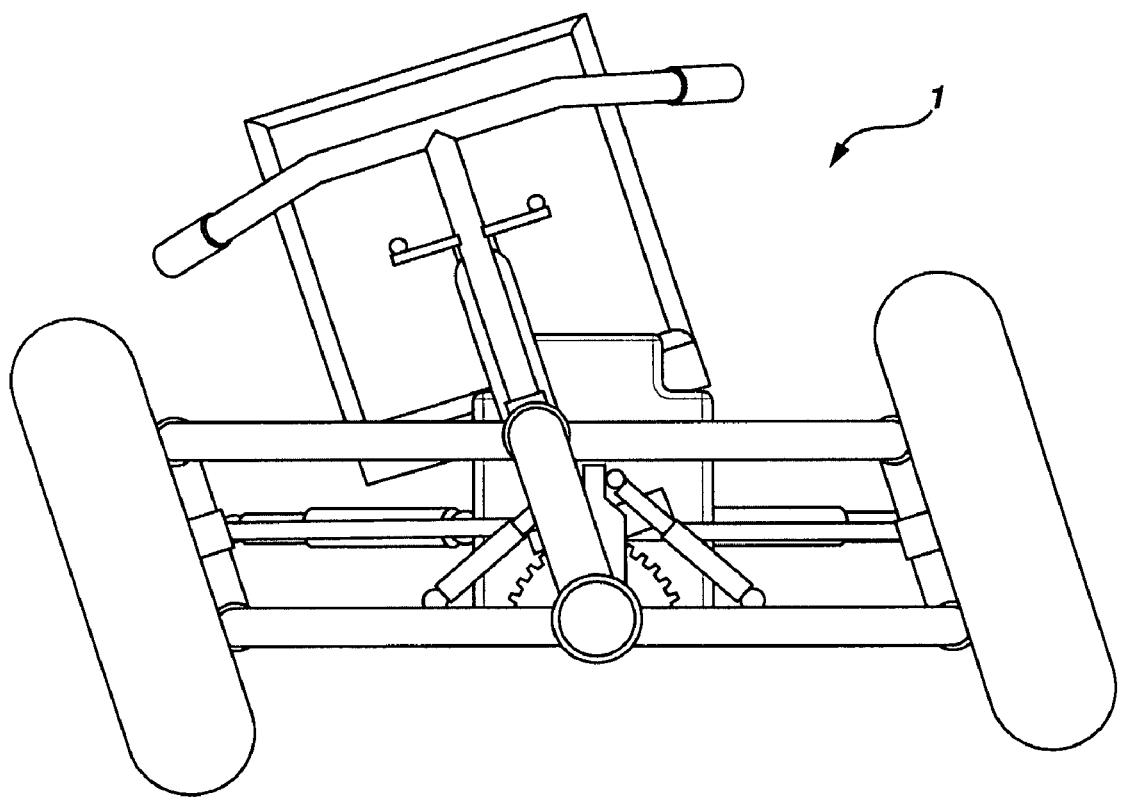
FIG. 9 is a front elevation view of the tilting chassis in a tilting configuration.

A suspension system 1 for a tilting vehicular chassis is shown in a neutral posture, wherein the vehicle may be parked or moving directionally forward, in FIGS. 1 and 2. FIG. 5 represents the suspension system 1 in the posture of a tilted turn. The articulation of suspension system 1 under certain road and steering conditions, as viewed frontally, is shown in FIGS. 7-9. FIG. 7 represents the neutral posture; FIG. 8 shows the suspension system encountering a shock load, as when traversing a road bump; and FIG. 9 illustrates the chassis in a tilting posture, as when banking for a right-hand turn.

Figure 3:
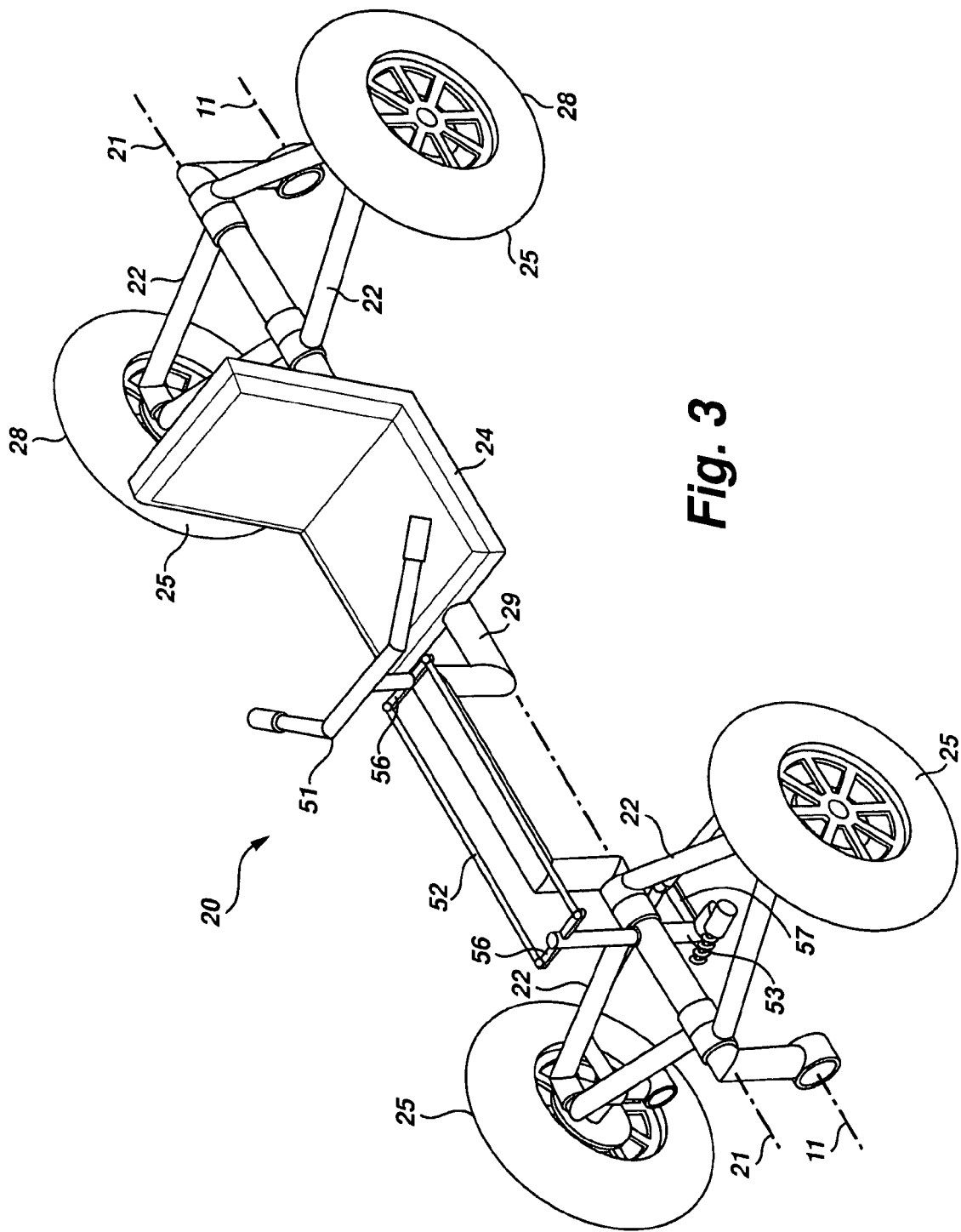
FIG. 3 is a perspective view of the tilting frame.
Figure 4:
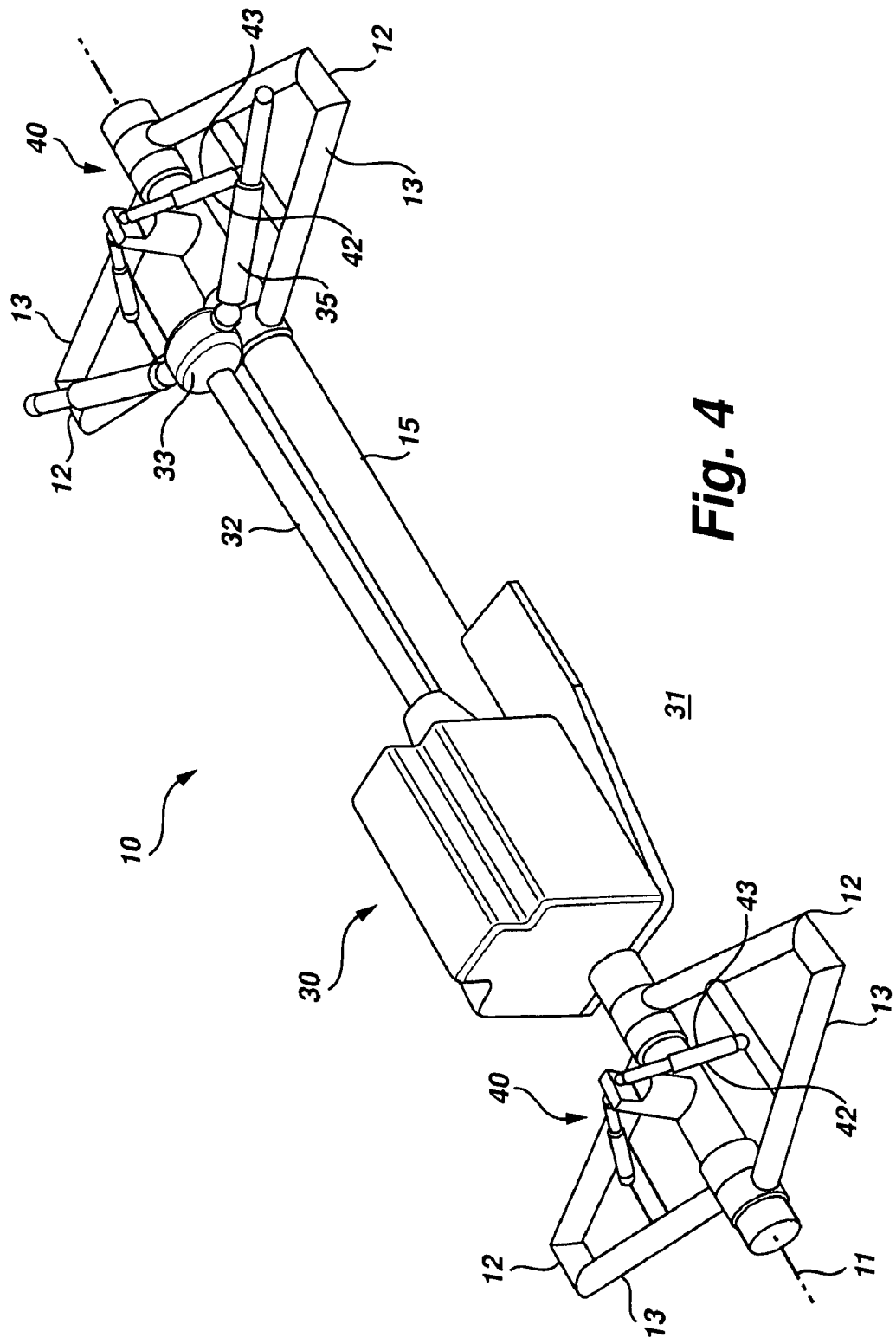
FIG. 4 is a perspective view of the non-tilting frame.

The details of suspension system 1 are best shown in FIGS. 3 and 4. FIG. 4 illustrates a non-tilting frame 10. Non-tilting frame 10 is comprised of a first longitudinal member 15 having a first axis 11. First horizontal members 12 are disposed about the first axis 11 and are rotatably attached, in oppositely-directed pairs, at the front and rear of first longitudinal member 15. In an alternate embodiment, first horizontal members 12 are disposed about a pair of first offset axes 14 (not shown), offset to each side from, and parallel to and planar with, the first axis 11. In the preferred embodiment, first horizontal members 12 are first A-arms 13.

Non-tilting frame 10 supports, at least, a means for motorizing 30. In the preferred embodiment, the means for motorizing 30 is comprised of an engine 31 and a power train 32. The power train 32 includes a differential (gear) joint 33 and at least one differential drive shaft spur 35 connecting the power train to the axle of a driven wheel 28 (see FIG. 3). The differential drive shaft spur 35 connects through universal joints common in the art (represented by spheres in the drawings).

Figure 10:
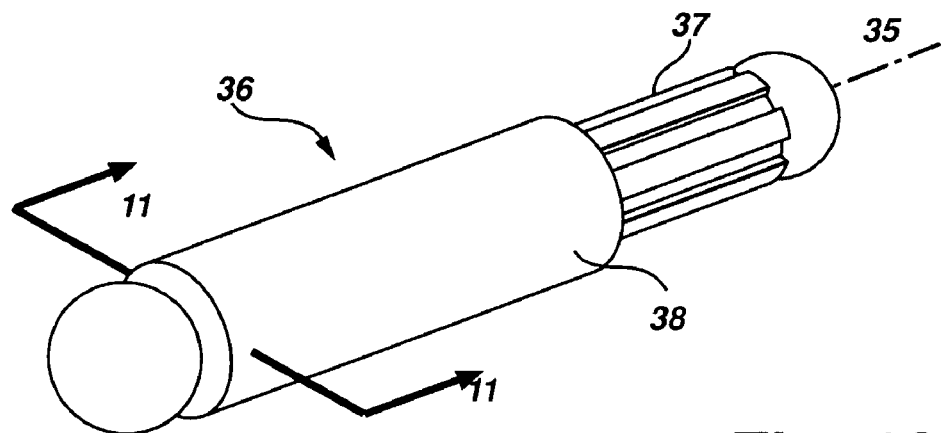
FIG. 10 is a perspective view of a telescoping drive shaft spur.
Figure 11:
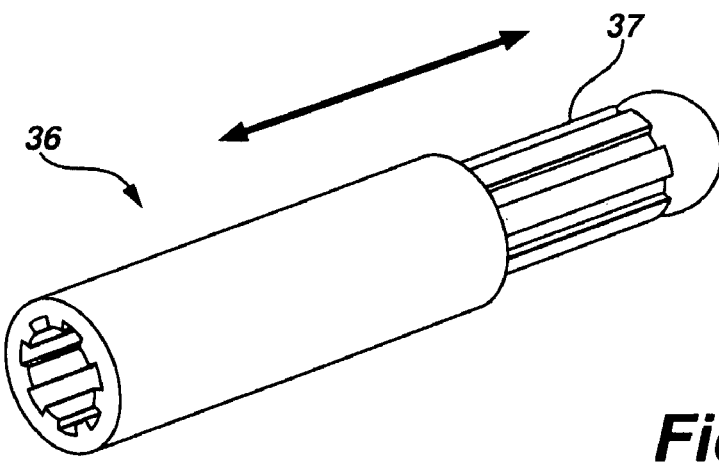
FIG. 11 is a sectional view of the telescoping drive shaft spur of FIG. 10.

In a particular preferred embodiment, the differential drive shaft spur 35 provides a means for telescopically lengthening and shortening 36, as best shown in FIGS. 10 and 11. The means for telescopically lengthening and shortening 36 is comprised of a splined shaft 37 which is slideably fitted to an internally-splined tube 38 to move along a spur axis 35. This movement provides length adjustment of the drive shaft spur needed for varying positions of the axle to which it is connected as the axle is tilted or otherwise vertically displaced in response to shock absorption. The splines of the splined shaft 37 and the internally-splined tube 38 mesh to render the unit rotatable about spur axis 35. Alternatively, in place of splines, the shaft and tube could be of angular geometry in cross-section, such as a square or polygonal.

Figure 12:
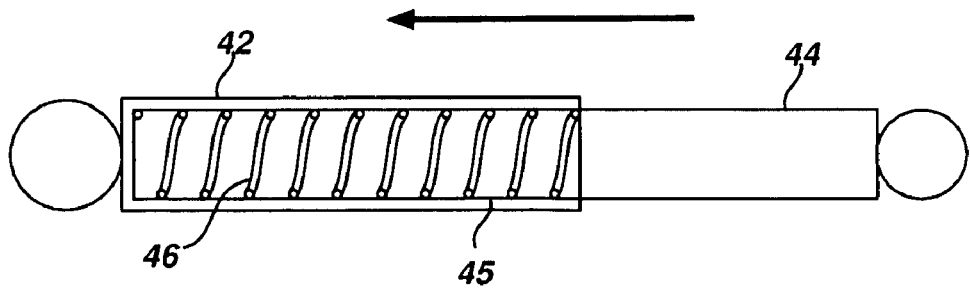
FIG. 12 is a half-sectional view of a shock absorber of the present invention

A means for suspending 40 is mounted on first longitudinal member 15 at the median of each pair of first horizontal members 12. In the preferred embodiment, the means for suspending 40 is comprised of vertical beams 41 braced by a pair of shock absorbers 42. Shock absorbers 42 are attached at one end to the top of each vertical beam 41 and at the other, to each flanking horizontal member 12, where they form a pair of mutually supporting triangular braces 43. In a particular preferred embodiment, each shock absorber 42 is comprised of a shaft 44 slidingly fitted to a tube 45 (see FIG. 12). A spring 46 housed within tube 45 biases shaft 44 to maintain the attached first horizontal member 12 substantially horizontal. In the case of a shock load, however, such as when the vehicle is traversing a bump or other surface disturbance, the spring 46 compresses to allow the first horizontal member 12 to flex upward and absorb the shock. In this manner, each of the first horizontal members 12 are independently suspended, but cooperatively buffered by mutually supporting triangular braces 43. The shock absorbers 42 are connected at each end by hinge joints common in the art (represented by spheres in the drawings).

FIG. 3 shows a tilting frame 20. Tilting frame 20 is rotatably connected to non-tilting frame 10 about first axis 11. Tilting frame 20 is comprised of a second longitudinal member 29 and a second axis 21. Similar to the case of first horizontal members 12, second horizontal members 22 are disposed about the second axis 21 and are rotatably attached, in oppositely-directed pairs, at the front and rear of the second longitudinal member 29. In the alternate embodiment discussed above, second horizontal members 22 are disposed about a pair of second offset axes 27 (not shown), offset to each side from, and parallel to and planar with, the second axis 21. In the preferred embodiment, second horizontal members 22 are second A-arms 26. Tilting frame 20 supports, at least, an occupant (not shown), which is represented in the figures by seat 24.

Vertical struts 23 rotatably connect corresponding first and second horizontal members in a way that the paired members are constrained to rotate about the first and second axes together with the inclination of vertical struts 23 maintained constant (see FIG. 7). Road wheels 25 are rotatably attached to vertical struts 23. In the alternative embodiment, the planes of first offset axes 21 and second offset axes 14 must be maintained parallel in order to preserve parallelism in the road wheels 25. In the preferred embodiment, there are four road wheels and four matched pairs of first and second horizontal members joined by a vertical strut. Two of the wheels are steering wheels and two, driven wheels. As shown in FIGS. 5, 8, and 9, the road wheels are enabled to roll, to raise, to tilt, and, as structure dictates, to turn and all simultaneously.

Tilting frame 20 further comprises a means for steering 50. The means for steering 50 includes handle bars 51 and steering arm 53, both of which are rotatably mounted to the second longitudinal member 29. A clockwise rotation of the handle bars 51, for example, is translated into a clockwise rotation of the steering arm 53 urged by linkages 52 applying torque through lever arms 56. Steering arm 53 is L-shaped, having vertical and horizontal legs. Horizontal leg 57 is rotatably connected at its distal end to tie rods 54, which, in turn, are rotatably connected to control arms 55 at each of the steering wheels (see FIG. 2). A clockwise rotation of steering arm 53 is thus translated into a clockwise rotation of the steering wheels, whereby a right turn is launched. If horizontal leg 57, tie rods 54, and control arms 55 are all coplanar with the hubs of the wheels, tilting frame 20 can tilt without substantially changing the steered angle of the wheels. Because the pivot point of the tie rods 54 and the pivot point of steering arm 53 is separated by the span of horizontal leg 57, the distance between the control arms 55 will be shortened to the base of the triangle formed by tie rods as they rotate out of co-linear. This will produce a shortened turn radius for the inside wheel of the turn, as appropriate for a turning pair of "common axle" wheels. Tie rods 54 make connection by universal joints and linkages 52, by pin-hinges, such mechanisms common in the art (represented by spheres in the drawings).

Figure 6:
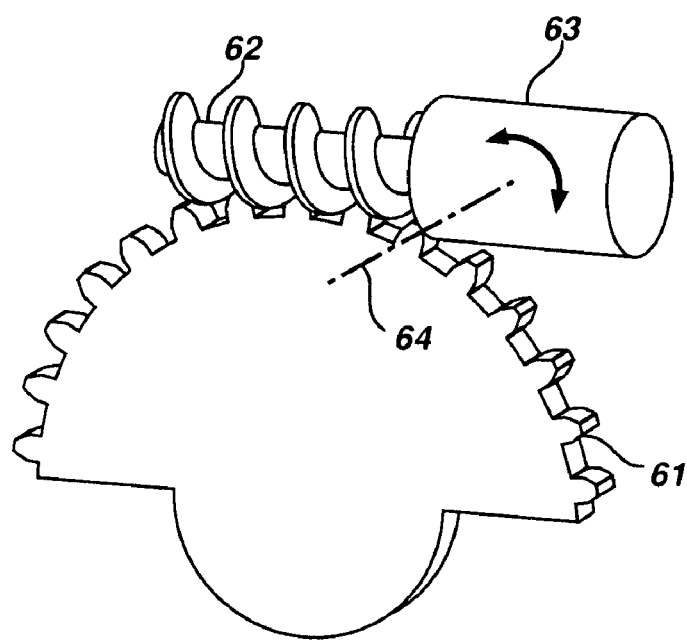
FIG. 6 is a partial perspective view of the tilt lock mechanism.

Tilting frame 20 also comprises a means for tilt control 60, as best shown in FIG. 6. Tilt control 60 includes a crescent gear 61 rigidly mounted to first longitudinal member 15 (see FIG. 7) to which worm gear 62 engages in meshing contact. Worm gear 62 is driven by worm gear motor 63. Worm gear motor 63 is rotatably mounted to second longitudinal member 29 about motor axis 64. When worm gear 62 is driven, it causes tilting frame 20 to rotate about first axis 11. Because gear motor 63 is reversible, causing the tilt direction be reversible, tilt adjustment can be made subject to operator control through a control interface (not shown). When the worm gear 62 is idle, the tilt will be locked in place because worm gears cannot be driven in reverse by meshing spur gears. This is useful in the situation of speeds less than 5 mph, where in the gyroscopic effect of the rotating wheels has not yet created a righting moment. Above 5 mph, the worm gear 62 can be rotated out of meshing contact with crescent gear 61 by means of operator input directing a tilt of motor 63 about motor axis 64.

In operation, the suspension system 1 resembles the dynamics of a motorcycle, except that the engine and power train do not rotate. Approaching a right turn, for example, the occupant/operator will initiate by a slight turn to the left, thereby causing an imbalance of forces which enable a lean to the right, followed by a steering turn to the right. The tilting frame of the chassis will tilt to the inside of the turn, the lean being controlled by steering input. The lean of the tilting frame, combined with the lateral shift of the non-tilting frame in response to the tilt of the wheel about an axis on the road surface, causes the combined center of mass to shift into balance with the centrifugal force resulting from the mean turn radius and the speed of the vehicle. The occupant/operator can then steer out of the turn and the tilt.

While a particular form of the invention has been illustrated and described, it will be apparent that various modifications can be made without departing from the spirit and scope of the invention. For example, the invention could be practiced with three road wheels, the third wheel being the steered wheel. Accordingly, it is not intended that the invention be limited, except as by the appended claims.

What is claimed is:

1. A suspension system for a tilting vehicular chassis, comprising:
    a non-tilting frame of longitudinal extent having a first axis and a plurality of first horizontal members, the first horizontal members rotatably attached in oppositely-disposed pairs about the first axis at least at each end, the non-tilting frame supporting at least a means for motorizing;
    a tilting frame of longitudinal extent rotatably attached to the non-tilting frame about the first axis, the tilting frame having a second axis parallel to the first axis and a plurality of second horizontal members, the second horizontal members rotatably attached in oppositely-disposed pairs about the second axis, each second horizontal member rotatably attached to a corresponding first horizontal member by a vertical strut, the tilting frame supporting at least one occupant;
    a plurality of road-contact wheels rotatably attached to the vertical struts, at least one wheel of which is connected to the means for motorizing; and
    a means for suspending the paired first horizontal members to ride level with the road while providing for a smooth ride by absorbing road surface irregularities in the articulating recoil of individual wheels.

2. The suspension system of claim 1, wherein the paired first and second horizontal members are matched A-arms.

3. The suspension system of claim 1, wherein the means for suspending comprises a vertical beam rigidly attached to the non-tilting frame at the middle of each pair of first horizontal members with one of a pair of shock absorbers extending from the top of the vertical beam to each individual first horizontal member of the flanking pair to form a triangular brace.

4. The suspension system of claim 3, wherein the shock absorber comprises a telescoping assembly of a shaft in a tube, the tube having a spring therein biasing the shaft to a fixed span of the brace at all times except when a shock load requires a telescopic contraction for relief.

5. The suspension system of claim 3, wherein the means for motorizing is an engine with a power train connected to at least one of the wheels.

6. The suspension system of claim 5, wherein the engine is an internal combustion engine.

7. The suspension system of claim 5, wherein the engine is a battery-powered electric motor.

8. The suspension system of claim 1, wherein the means for motorizing is one, or a combination, of gas, diesel, hybrid, solar, or fuel cell.

9. The suspension system of claim 5, wherein the power train includes a differential joint and at least one differential drive shaft spur connecting the differential joint to at least one driven wheel.

10. The suspension system of claim 9, wherein the differential drive shaft spur has an axis and a means for telescopically lengthening and shortening along said axis to accommodate varying distances from the at least one driven wheel to the differential joint caused by tilting or by articulating horizontal members responding to shock absorption.

11. The suspension system of claim 10, wherein the means for telescopically lengthening and shortening is a splined shaft in an internally splined tube, the interposition of the splines rendering the unitary shaft rotatable about the drive shaft spur axis.

12. The suspension system of claim 1, wherein the pluralities of first horizontal members, second horizontal members and wheels is four.

13. A suspension system for a tilting vehicular chassis, comprising:
a non-tilting frame of longitudinal extent having a first axis and a plurality of first horizontal members, the first horizontal members rotatably attached in oppositely-disposed pairs about a first pair of offset axes, offset by a preferred distance to each side of, and parallel to and co-planar with, the first axis at least at each end, the non-tilting frame supporting at least a means for motorizing;
a tilting frame of longitudinal extent rotatably attached to the non-tilting frame about the first axis, the tilting frame having a second axis parallel to the first axis and a plurality of second horizontal members, the second horizontal members rotatably attached in oppositely-disposed pairs about a second pair of offset axes, offset by the preferred distance to each side of, and parallel to and co-planar with, the second axis, each second horizontal member rotatably attached to a corresponding first horizontal member by a vertical strut, the planes of first and second offset axes remaining parallel to each other constantly, the tilting frame supporting at least one occupant;
a plurality of road-contact wheels rotatably attached to the vertical struts, at least one wheel of which is connected to the means for motorizing; and
a means for suspending the paired first horizontal members to ride level with the road while providing for a smooth ride by absorbing road surface irregularities in the articulating recoil of individual wheels.

14. The suspension system of claim 13, wherein the means for suspending comprises a vertical beam rigidly attached to the non-tilting frame at the middle of each pair of first horizontal members with one of a pair of shock absorbers extending from the top of the vertical beam to each individual first horizontal member of the flanking pair to form a triangular brace.

15. The suspension system of claim 14, wherein the shock absorber comprises a telescoping assembly of a shaft in a tube, the tube having a spring therein biasing the shaft to a fixed span of the brace at all times except when a shock load requires a telescopic contraction for relief.

16. The suspension system of claim 14, wherein the means for motorizing is an engine with a power train connected to at least one of the wheels.

17. The suspension system of claim 16, wherein the power train includes a differential joint and at least one differential drive shaft spur connecting the differential joint to at least one driven wheel.

18. The suspension system of claim 17, wherein the differential drive shaft spur has an axis and a means for telescopically lengthening and shortening along said axis to accommodate varying distances from the at least one driven wheel to the differential joint caused by tilting or by articulating horizontal members responding to shock absorption.

19. The suspension system of claim 18, wherein the means for telescopically lengthening and shortening is a splined shaft in an internally splined tube, the interposition of the splines rendering the unitary shaft rotatable about the drive shaft spur axis.

20. The suspension system of claim 13, wherein the pluralities of first horizontal members, second horizontal members and wheels is four.

* * * * *